(12) United States Patent
Pecheny

(10) Patent No.: US 7,031,985 B1
(45) Date of Patent: Apr. 18, 2006

(54) LEXICAL CACHE

(75) Inventor: Boris Pecheny, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/263,068

(22) Filed: Mar. 8, 1999

(51) Int. Cl.
 *G06F 17/30* (2006.01)

(52) U.S. Cl. ............................ 707/200; 707/8; 704/10; 711/118

(58) Field of Classification Search ........ 707/200–206, 707/100–104.1, 1–10; 704/9–10, 1; 709/215; 711/1, 113, 118
See application file for complete search history.

(56) References Cited

U.S. PATENT DOCUMENTS

| | | | |
|---|---|---|---|
| 5,623,609 A * | 4/1997 | Kaye et al. ................... 704/1 |
| 5,706,365 A * | 1/1998 | Rangarajan et al. ........ 707/102 |
| 5,774,588 A * | 6/1998 | Li ............................... 382/230 |
| 5,946,679 A * | 8/1999 | Ahuja et al. .................... 707/3 |
| 6,073,129 A * | 6/2000 | Levine et al. ................... 707/4 |
| 6,169,969 B1 * | 1/2001 | Cohen ......................... 704/10 |
| 6,219,666 B1 * | 4/2001 | Krishnaswamy et al. ...... 707/8 |
| 6,237,000 B1 * | 5/2001 | Dahlen et al. .............. 707/100 |

\* cited by examiner

*Primary Examiner*—Shahid Alam
*Assistant Examiner*—Jean Bolte Fleurant

(57) ABSTRACT

A lexical cache comprises a collection of lexical containers, such as tuned hash table, that are organized according to the length of the keys to be looked up in the lexical cache. In one embodiment, the word is compressed to generate a key. Based on the length of the key and optionally a prefix, a hash table is identified from among the collection of hash tables. A hash value is computed for the key, and the hash table is searched for a slot holding a key value matching the key. If a slot having a key value matching the key was found, then the relative position of the key value within the corresponding sequence of slots is moved toward the beginning of the corresponding sequence.

36 Claims, 3 Drawing Sheets

LEXICAL CACHE

FIELD OF THE INVENTION

The present invention relates to computer systems and more particularly to caching techniques for lexical data.

BACKGROUND OF THE INVENTION

Relational databases store information in collections of tables, in which each table is organized into rows and columns. The various rows of database tables in traditional applications tend to be accessed with, more or less, a uniform frequency. Thus, the vast majority of accesses to a database table in traditional applications are not skewed to a relatively small number of rows. Accordingly, various index structures and caches have been developed for efficiently searching large tables with the assumption that the access pattern is more or less uniform. Specifically, index structures provide an easily searched mapping between row identifiers and key values derived from a column of the corresponding row. Many of these index structures, such as a B-tree index, are characterized by search times that are relatively uniform for each access key.

For applications performing text analysis, on the other hand, the majority of accesses are highly skewed to relatively few rows of a database table. For example, a natural language processing application for interpreting English documents may implement a lexicon using a table that contains a row for every English word. The pattern of accesses to this table is likely to be highly skewed in a Zipf distribution, because a small percentage of English words (around 10%) account for the vast majority (>85%) of words in an English document.

Use of conventional relational database index structures to index this table, however, results in a sub-optimal performance for natural language processing applications, because the search time for very frequently accessed keys is no less than the access time for rarely accessed keys. What is needed, therefore, is a caching methodology such that searching a table of lexical data for frequently accessed keys results in search times that are significantly smaller than search times for rarely accessed keys. Addressing this need is complicated by the fact that the most frequently used words for a specific topic or set of related documents, aside from a relatively small set of about 1500 words, varies greatly from topic to topic. Therefore, it is difficult to statically determine ahead of time the 40,000–60,000 words to put in a lexical cache for a topic that would have an acceptable hit rate of about 95%.

Furthermore, this need is particularly acute as natural language processing applications grow to access huge tables storing lexical entities such as words and phrases. For example, a lexicon may include 600,000 words and phrases, and the industry trend is toward dramatically larger lexicons.

SUMMARY OF THE INVENTION

Accordingly, these and other needs are addressed by the present invention, which provides a lexical cache comprising a collection of lexical containers, organized according to the length of the words. The present invention stems from the realization that, when the lexicon is divided into several subsets containing words of the same length, the subsets with the shorter length words tend to have a greater frequency of usage, relative to the number of words in the subset, than subsets with longer length words. For example, words from a subset of 5905 three-letter words are more likely to be used than words from a subset of 10,561 six-letter words.

One aspect of the invention is a computer-implemented method and a computer-readable medium bearing instructions for searching for a string in a lexical cache. In accordance with the methodology, a key is generated based on the string, for example, by compression. A lexical container, such as a hash table, is identified from a plurality of lexical containers based on the length of the key, and the identified lexical container is searched for an entry associated with the string. By identifying the lexical container to be search based on the length of the key, the lexical containers can be implemented easily and efficiently, for example, by a collection of fixed-size key hash tables.

Furthermore, the size and performance of each lexical container can be individually tuned to account for the frequency patterns of each subset of the lexicon divided by length. For example, lexical containers for shorter length words can be configured to be larger than the lexical containers for longer words. Thus, the lexical cache would hold a higher proportion of the subset of shorter length words than the subset for longer length words. Since words from a shorter word length lexical container tend to be more frequently accessed, relative to the size of the lexical container, the lexical cache by its structure will tend to contain more frequently accessed words.

In one embodiment, the string is compressed to generate a key. Based on the length of the key, a hash table is identified from among a plurality of hash tables. The hash table is organized as sequences of slots for holding respective key values, with each sequence of slots corresponding to a respective hash value. A hash value is computed based on the key, and the hash table is searched based on the hash value for a slot holding a key value matching the key. If a slot having a key value matching the key was found, then the relative position of the key value within the corresponding sequence of slots is moved toward the beginning of the corresponding sequence. By reordering the position of keys in the hash table, more frequently used keys will percolate to the beginning of their sequence, enabling on a dynamic basis faster access times for more frequently used keys.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for caching lexical data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Hardware Overview

Figure 1:
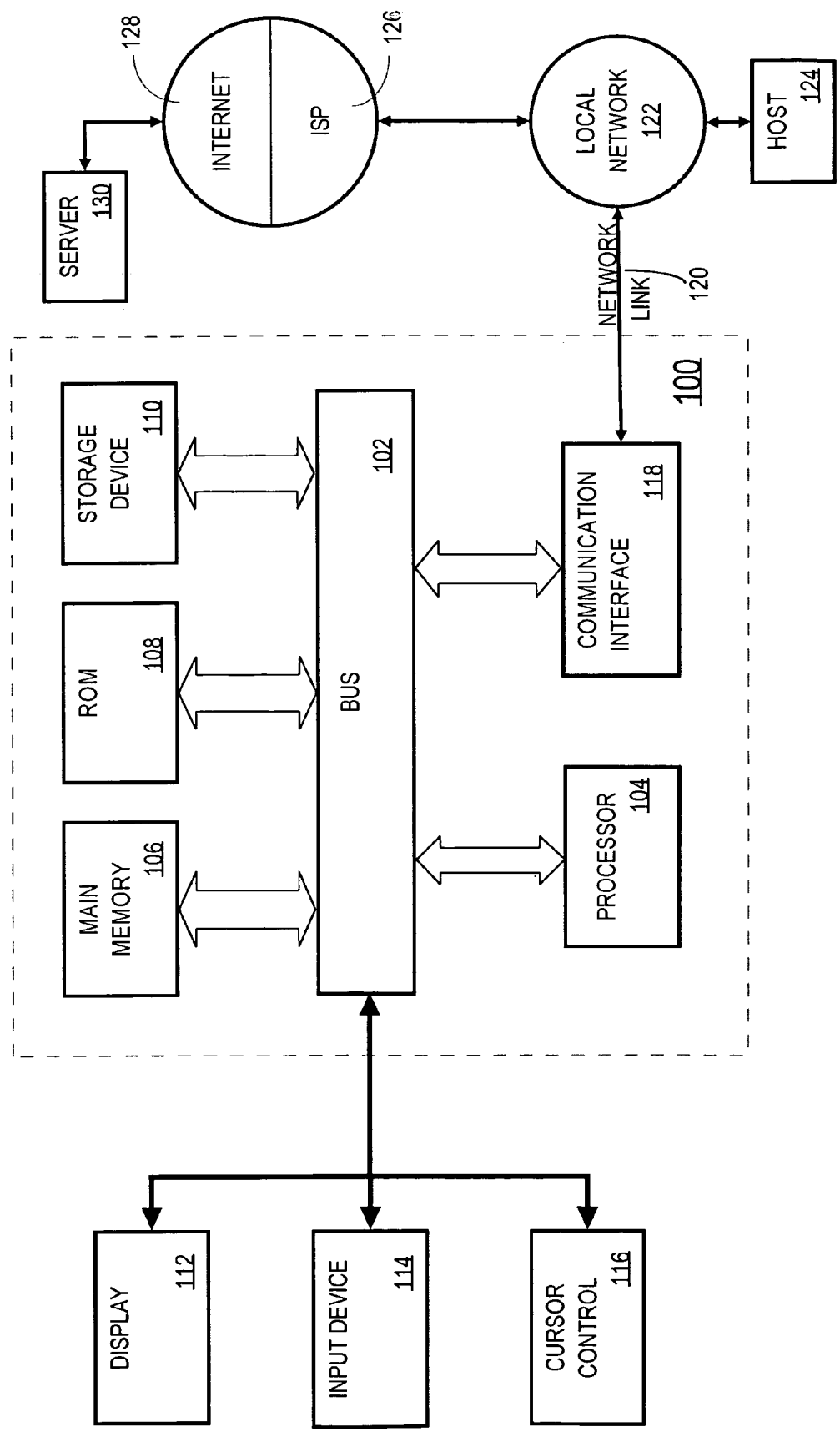
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for caching lexical data. According to one embodiment of the invention, caching lexical data is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include-dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for caching lexical data as described herein. The received code may be executed by processor 104 as it is received, and/or stored in storage device 110, or other non-volatile storage for later execution. In this manner, computer system 100 may obtain application code in the form of a carrier wave.

Lexical Cache

Figure 2:
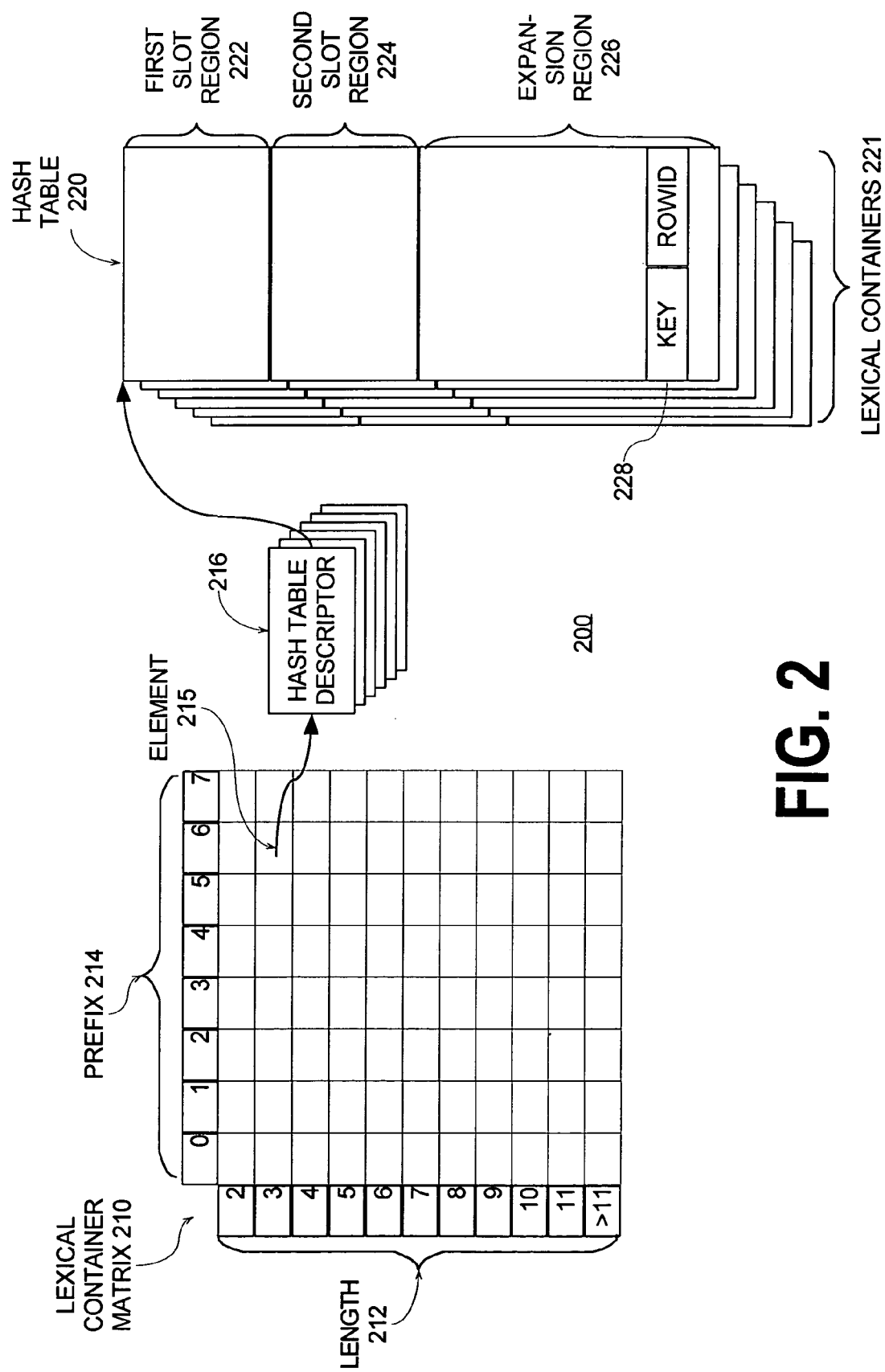
FIG. 2 is a schematic diagram of data structures in accordance with an embodiment of the present invention.

Referring to FIG. 2, depicted is a schematic diagram of portions of a lexical cache 200, stored in a computer-readable medium. The lexical cache 200 is an index structure for a lexicon stored in a relational database table (the "lexicon table"). Each row in the lexicon table has a column value that stores a word or phrase.

The lexical cache 200 contains a plurality of entries, such as entry 228, indicating a mapping between (1) row identifiers of the rows in the lexicon table, and (2) key values. For any given row, the key value that maps to the row is derived from the word or phrase stored in the row. Thus, a row in the lexicon table for a particular word is located based on the word by converting to the word into a key and searching the lexical cache 200 for an entry 228 having a key value equal to the search key. If the entry 228 is found, then the row identifier in the entry 228 is used to access the row in the lexicon table. If the entry 228 is not found, then an auxiliary index structure, such as a B-tree built upon the lexicon table, is consulted to determine the appropriate row identifier. Owing to the large size of typical lexicons, it desirable to limit the lexical cache 200 to the most frequently accessed keys value.

The entries of the lexical cache 200 are grouped into units, which are referred to herein as "lexical containers," based on the length of the key. A lexical container is a data structure arranged to store a number of the entries of the lexical cache 200. Stemming from the realization that keys of different lengths have different usage frequencies, each lexical container is dedicated for storing keys of a particular length, except those lexical containers assigned to store entries for a small number of very long but rare keys. In some embodiments, the size of each lexical container will vary depending on the length of the key. For example, it is contemplated that the lexical containers for keys of length 3 store more entries in total than lexical containers for keys of length 10.

In a preferred embodiment, the lexical containers are implemented by hash tables 221, such as hash table 220, although it is contemplated that other embodiments may employ other kinds of data structures, such as binary trees or splay trees, to implement the lexical containers. A hash table is a data structure that contains an array of hash table entries. Each hash table entry is associated with a key value. For any given hash table entry, an algorithm is applied to the key value associated with the entry to calculate an index into the array. The index thus produced indicates the location within the array into which the hash table entry should be placed. An array element that holds a key value is called a "slot," and the algorithm that produces the index or "hash value" for a given key is called a "hash function." Various hash functions may be used. According to one embodiment, a hash function is used which applies the byte values of the key as roots to a polynomial and computes a remainder of the sum modulo a predetermined prime number.

The hash function could produce the same hash value for different keys, so that two keys may legitimately be assignable to the same slot. This event is referred to as a "collision." There are a variety of techniques for resolving collisions. One technique, "open address hashing," involves adding a constant to the hash value to index another slot in the hash table. If the new hash value also results in a collision, this process is repeated, generating a sequence of slots, until an empty slot is found, i.e. there are no more collisions for the key. "Chaining" is another technique in which linked lists are maintained for each hash value. A linked list maintains, for each entry, a one- or two-byte displacement or other pointer to the next slot in a sequence of slots assigned for the hash value. Upon a collision, the new key value is added somewhere in the linked list.

Preferably, a combination of open address hashing and chaining is used for handling collisions. Specifically, hash table 220 uses open address hashing for the first two slots in sequence of slots for a hash value and chaining for the third and subsequent slots. Accordingly, hash table 220 contains the predetermined prime number of slots in a first region 222 of slots, a second region 224 of slots numbering the predetermined prime number, and an expansion region 226 of another predetermined number of slots. This combination of open address hashing and chaining guarantees that there are at least two slots in the hash table for every hash value.

The performance characteristics of searching hash table 220 depends on whether the entry for a given key value is cached, and on the number of collisions that are encountered when searching for the entry. The number of collisions for each hash value can be reduced by arbitrarily limiting each sequence of slots allocated to each hash value to a particular maximum. Thus, when the limit is reached, the search among the sequence of slots is terminated as unsuccessful. Empirical testing suggests that the performance of searching a linked list of entries tends to degrade at about 18 entries.

However, if the maximum collision length for each hash value is limited, then it becomes less likely for a given key to be stored in the hash table 220, potentially resulting in an expensive lexical cache 200 miss. Furthermore, increasing the prime number can ameliorate the effects of limiting the collision length, but the prime number cannot be increased beyond the size of the hash table 220. Thus, the desirable performance parameters, the maximum number of collisions and the prime number, depend on the size of the hash table 220.

According to one embodiment, the sizes of the hash tables 221 within lexical cache 200 vary depending on the length of the keys stored in the hash tables 221. Thus, the performance characteristics of hash table 220, characterized by such parameters as the prime number of the hash function, the maximum number of slots, and the maximum number of allowed collisions, are preferably tuned on a case-by-case basis. These and other hash table specific parameters are conveniently stored in an aggregate data structure referred to as a descriptor 216, along with a reference to the corresponding hash table.

The exact values of the tunable parameters for the hash tables will vary from implementation to implementation, depending, for example, on a user-specified lexical cache size in terms of a desired number of total slots. Nevertheless, it is possible to apply general principles of communications theory in estimating good values for the tunable parameters. See generally, G. K. Zipf, The Psycho-Biology of Language, Houghton Mifflin Co., Boston, 1935; C. E. Shannon, "A mathematical theory of communication," Bell System Technical Journal, 27, 379–423 (1948) and 27, 623–656 (1948).

For example, Zipf's Law is used to describe the usage frequency distribution among all entries of an English lexicon. Another phenomenon less frequently mentioned or used is the following approximation of the word length—usage frequency dependency:

$$P_{len} = A + KN_{len}e^{-Rlen}, \quad (1)$$

where $P_{len}$ is the probability of word in a text is of length len, $N_{len}$ is the number of words of length len in the lexicon, and A, K, and R are empirical coefficients. For one English text corpus, the values of the empirical coefficients have been calculated to be: $A=9\times10^{-6}$, $K=0.121$, and $R=3.75$.

In one embodiment, therefore, the maximum number of slots, $M_i$ for a hash table storing key values of length i is tuned according to the following formula:

$$M_i = \left(\frac{S_a}{N}N_i + \frac{S_b}{R_i}\right)\left(1 + \frac{i}{200}\right), \quad (2)$$

where $S_a=0.17S$, $S_b=0.83S$, S is the desired number of total slots in the lexical cache 200, N is the number of words in a sampled text, $N_i$ is the number of the sampled (compressed) words of length i in the sampled text, $R_i$ is the ratio $\ln(O_i/N_i)/\ln(O/N)$, O is the sum of all occurrences of single words in the sampled text, and $O_i$ is the number of occurrences of single words of length i in the sampled text.

The prime number, $P_i$ for the hash table storing key values of length i is tuned according to the following formula:

$$P_i = \left\lfloor \frac{M_i}{e(2 - R_i/2)} \right\rfloor. \quad (3)$$

The maximum length of collisions, $L_i$ for the hash table storing key values of length i is tuned according to the following formula:

$$L_i = 2.1\ln(P_i) - 3.7R_i. \quad (4)$$

These parameters are calculated for each hash table 221 when the lexical cache 200 is initialized.

In one embodiment, the various lexical containers that the lexical cache 200 comprises are organized into a lexical container matrix 210. Each element of the lexical container matrix 210 references one of the lexical containers. For example, one element 215 in the lexical container matrix 210 contains a pointer to the hash table descriptor 216 of the hash table 220. Hash table descriptor 216, in turn, contains the parameters of hash table 220, and a pointer to hash table 220.

In this embodiment, the element 215 of the lexical container matrix 210 actually references the descriptor 216 for the corresponding hash table 220. The appropriate hash table parameters for the corresponding hash table 220 (for example, the prime number) are fetched from the descriptor 216.

Since each lexical container is associated with keys of a particular length, the lexical container matrix 210 has at least one dimension, which corresponds to the length 212 of the keys stored in the associated lexical containers. Accordingly, the lexical container matrix 210 is indexed in one dimension based on the length of the key. In one embodiment, entries for one-byte keys (not shown) are stored in a 256 element array indexed by the one-byte key, due to the limited number of possible one-byte values. Entries for keys with a length greater than a prescribed cutoff, for example 11, are coalesced into a single row of the lexical container matrix 210. Thus, the lexical containers of the lexical cache 200 are readily identifiable by the length of the key.

The overhead incurred by searching a hash table depends on the number of collisions that are encountered, which is roughly equal to the logarithm of the size of the hash table. In one embodiment, another dimension, "prefix" 214, is added to the lexical container matrix 200 to provide a plurality of different, smaller hash tables for the same key length. Since each hash table is smaller, the number of collisions is fewer and the performance of the searching one of the smaller tables is improved over searching one large table.

Therefore, each key is assigned to one of the smaller hash tables. In one embodiment, this assignment is based on the "prefix" of the key, which can be defined as a predetermined subset of a particular byte of the key, such as the three least significant bits of the first byte, resulting in a more or less uniform distribution of prefixes. Accordingly, the prefix 214 dimension of the lexical cache 210 provides a mechanism for identifying one of the smaller hash tables for a particular search key.

Searching the Lexical Cache

Figure 3:
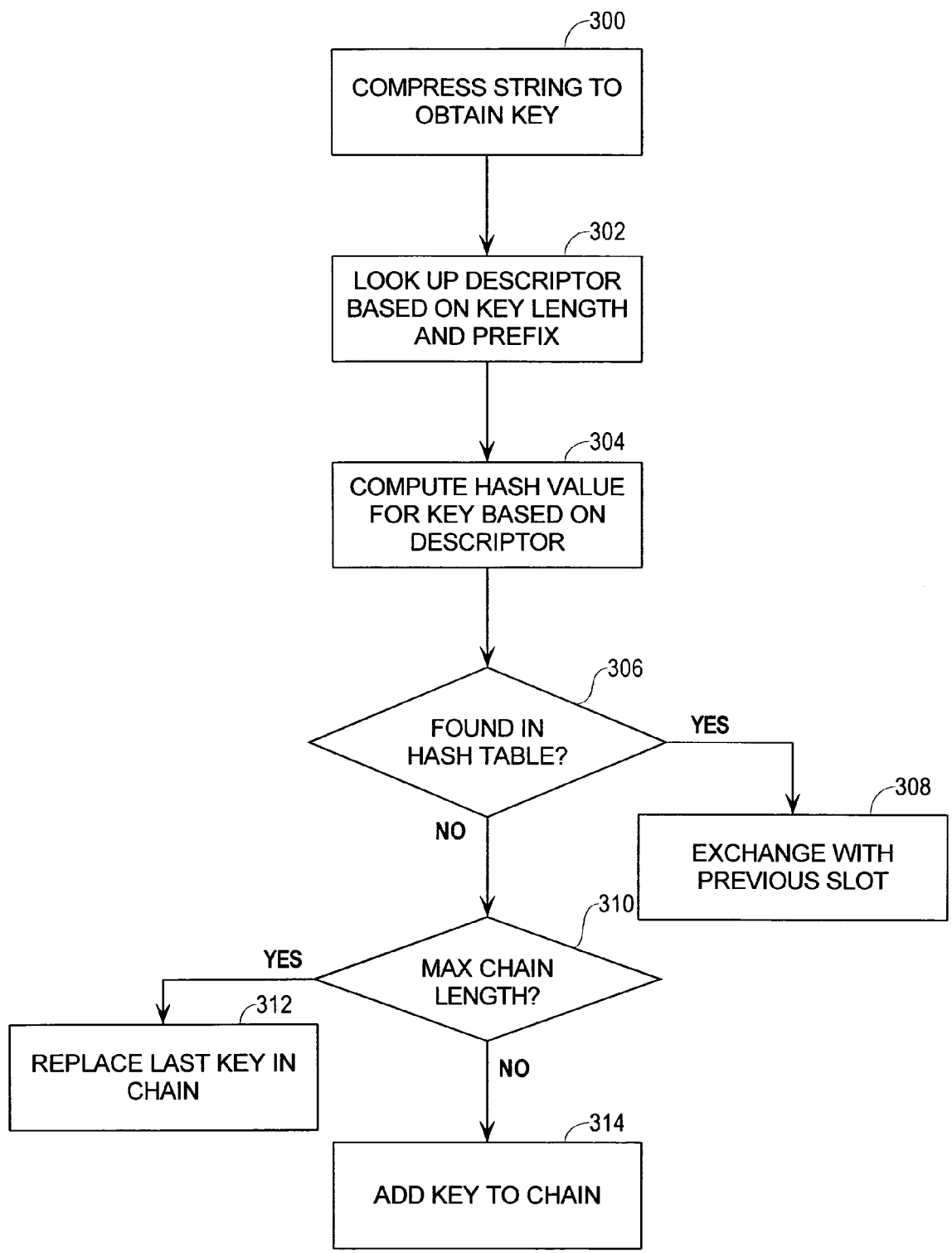
FIG. 3 is a flowchart illustrating how a key is searched for in a lexical cache in accordance with an embodiment of the present invention.

FIG. 3 is a flowchart illustrating how a string representing a word or other lexical item is searched for in the lexical cache 200 in accordance with an embodiment of the present invention. At step 300, the string to be looked up in the lexical cache 200 is compressed to produce the key. A number of compression techniques may be employed, for example, Huffman encoding, n-gram compression, or even no compression. Huffman encoding is a compression technique with variable length codes, and n-gram compression utilizes fixed length codes in which about 80–90 of the possible values of an 8-bit byte are reserved for the basic alphabet and the remaining 170 or so values are assigned to frequently occurring combinations of two or more letters. Compression also helps in obtaining a roughly uniform distribution of prefixes.

At step 302, a descriptor is looked up using the lexical container matrix 210. Specifically, a cell in lexical container matrix is identified based on the length of the key and the prefix (e.g. least three significant bits of the first byte of the key). Indexing the lexical container matrix 210 by the length of the key and the prefix yields the cell that contains a reference to a descriptor 216. The descriptor thus referenced identifies the lexical container that would contain the entry for the string for which the search is being performed.

In one embodiment, keys of length one are handled separately in their own 256-entry array (not shown). Key lengths greater than a preset cutoff, e.g. 11, are coalesced into a single row of the lexical container matrix 210 due to the relatively small number of words of such large lengths, especially if compression is employed.

At step 304, the hash value for the key is computed based on a hash function specified in the descriptor 216. Specifically, the hash function applies the byte values of the key as roots to a polynomial and computes a remainder of the sum modulo $P_i$, the prime number stored in the descriptor 216. As a result, the hash value will range from 0 to $P_i$ and will be used to index the first region 222 of slots.

At step 306, the hash table is searched until it can be determined if a slot with a key value matching the key is found. If the first slot is empty, then the key is copied into the slot and returned. If the key is equal to the key value of the first slot, then the matching slot is found and returned. If the key is not equal to the key value of the first slot, then the prime number $P_i$ is added to the hash value in an open address fashion to index a slot in the second region 224 of slots.

Similarly, if the second slot is empty, then the key is copied into the slot and returned. If the key is equal to the key value of the second slot, then the matching slot is found and returned. If the key is not equal to the key value of the second slot, then the links of the current chain is followed in the expansion region until the a slot having a key value matching the key is found or until the maximum length of the cha in $L_i$ is reached (e.g. step 310).

If a matching slot is found in the hash table, the slot is exchanged with the previous slot in the chain (step 308). Thus, upon each access, a slot is moved toward the beginning of the sequence of slots defined by the open address hashing and chaining combination. Consequently, more frequently accessed key values are percolated toward the beginning of the sequence, thereby reducing the number, of collisions and improving the search time of future access for such key values.

If the maximum length of the chain $L_i$ is reached, then the key value of the last slot in the chain is replaced by the search key (step 312), thereby discarding a relatively infrequently accessed key value. On the other hand, if the maximum length of the chain $L_i$ is reached, then the search key is simply added as the last slot in the chain (step 314), thereby being cached for a possible future access. Allocating a new slot for the last slot in the chain may be obtained by incrementing a pointer in the descriptor 216 to the next available slot in the expansion region 226 and adjusting the link from the previous slot in the chain.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of searching for a string in a lexical cache, comprising the computer-implemented steps of:
    generating a key based on the string;
    selecting a lexical container from among a plurality of lexical containers based on a length of the key, said lexical containers associated with respective key lengths and configured to hold respective maximum numbers of entries based on the respective key lengths; and
    searching the selected lexical container for an entry associated with the string based on the key,
    wherein at least one of the lexical containers is configured to hold a different maximum number of entries than at least another one of the lexical containers.

2. The method of claim 1, wherein the step of generating a key based on the string includes the step of compressing the string to produce the key.

3. The method of claim 2, wherein the step of compressing the string to produce the key includes the step of performing an n-gram compression on the string.

4. The method of claim 1, wherein the step of generating a key based on the string includes the step of using the string as the key.

5. The method of claim 1, wherein the step of selecting a lexical container includes the steps of:
    generating a prefix based on the key; and
    selecting the lexical container from among the plurality of the lexical containers based on the length of the key and the prefix.

6. The method of claim 1, wherein:
    a first lexical container of the lexical containers is associated with a first key length;
    a second lexical container of the lexical containers is associated with a second key length;
    the first key length is less than the second key length; and
    the first lexical container is configured to hold more entries than the second lexical container.

7. The method of claim 1, wherein the step of searching the selected lexical container includes searching only the selected lexical container.

8. A method of searching for a string in a lexical cache, comprising the computer-implemented steps of:
    generating a key based on the string;
    identifying a hash table from among a plurality of hash tables based on the length of the key, said hash table containing sequences of slots for holding entries associated with strings, each of said sequences of slots corresponding to a respective hash value, wherein at least one of the hash tables is configured to hold a different number of slots than at least another one of the hash tables;
    computing a hash value based on the key; and
    searching the hash table based on the hash value for a slot holding an entry associated with said string.

9. The method of claim 8, wherein the step of computing a hash value based on the key includes the step of computing the hash value based on the key and a prime number associated with the hash table.

10. The method of claim 9, wherein the step of searching the hash table based on the hash value includes the steps of:
    indexing one or more fixed regions of the hash table, each of the fixed regions having the prime number of slots, based on the hash value to identify one or more respective slots; and
    inspecting the one or more respective slots for a respective key value matching the key.

11. The method of claim 10, wherein the step of searching the hash table further includes the step of searching for the key in a linked list of slots stored in an expansion region of the hash table, if the key was not found in the one or more respective slots for the key.

12. The method of claim 8, further including the step of, if an entry for the string is not found at a first slot that corresponds to the hash value, but is found in a slot that belongs to a sequence of slots that correspond to keys that produce said hash value, then moving a relative position of the entry for the string within the sequence of slots toward the beginning of the sequence of slots.

13. The method of claim 8, further comprising the step of initializing a descriptor for the hash table, said descriptor storing a reference to the hash table and parameters for the hash table;
   wherein the step of identifying a hash table includes the step of identifying a descriptor indicating the hash table and a prime number.

14. The method of claim 13, wherein the step of initializing a descriptor for the hash table includes the step of initializing a prime number for use in computing a hash value.

15. The method of claim 13, wherein the step of initializing a descriptor for the hash table includes the step of initializing a maximum number of slots for the hash table.

16. The method of claim 13, wherein the step of initializing a descriptor for the hash table includes the step of initializing a maximum length of the sequences of slots for the hash table.

17. A method of searching for a string in a lexical cache, comprising the computer-implemented steps of:
   compressing the string to generate a key;
   identifying a hash table from among a plurality of hash tables based on a length of the key, said hash table containing sequences of slots for holding respective key values, each of said sequences of slots corresponding to a respective hash value and a number of slots being based on a respective key length, wherein at least one of the hash tables is configured to hold a different number of slots than at least another one of the hash tables;
   computing a hash value based on the key;
   using said hash value to locate a beginning of the particular sequence of slots that correspond to said hash value;
   searching the particular sequence of slots for a slot holding a key value matching the key; and
   if a slot having a key value matching the key is found in the particular sequence of slots, but is not at the beginning of said particular sequence of slots, then moving a relative position of the key value within the particular sequence of slots toward the beginning of the particular sequence of slots.

18. A computer-readable storage medium bearing instructions for searching for a string in a lexical cache, said instructions arranged, when executed by one or more processors, to cause the one or more processors to perform the steps of:
   generating a key based on the string;
   selecting a lexical container from among a plurality of lexical containers based on a length of the key, said lexical containers associated with respective key lengths and configured to hold respective maximum numbers of entries based on the respective key lengths; and
   searching the selected lexical container for an entry associated with the string based on the key,
   wherein at least one of the lexical containers is configured to hold a different maximum number of entries than at least another one of the lexical containers.

19. The computer-readable medium of claim 18, wherein the step of generating a key based on the string includes the step of compressing the string to produce the key.

20. The computer-readable medium of claim 19, wherein the step of compressing the string to produce the key includes the step of performing an n-gram compression on the string.

21. The computer-readable medium of claim 18, wherein the step of generating a key based on the string includes the step of using the string as the key.

22. The computer-readable medium of claim 18, wherein the step of selecting a lexical container includes the steps of:
   generating a prefix based on the key; and
   selecting the lexical container from among the plurality of the lexical containers based on the length of the key and the prefix.

23. A computer-readable storage medium bearing instructions for searching for a string in a lexical cache, said instructions arranged, when executed by one or more processors, to cause the one or more processors to perform the steps of:
   generating a key based on the string;
   identifying a hash table from among a plurality of hash tables based on the length of the key, said hash table containing sequences of slots for holding entries associated with strings, each of said sequences of slots corresponding to a respective hash value, wherein at least one of the hash tables is configured to hold a different number of slots than at least another one of the hash tables;
   computing a hash value based on the key; and
   searching the hash table based on the hash value for a slot holding an entry associated with said string.

24. The computer-readable medium of claim 23, wherein the step of computing a hash value based on the key includes the step of computing the hash value based on the key and a prime number associated with the hash table.

25. The computer-readable medium of claim 24, wherein the step of searching the hash table based on the hash value includes the steps of:
   indexing one or more fixed regions of the hash table, each of the fixed regions having the prime number of slots, based on the hash value to identify one or more respective slots; and
   inspecting the one or more respective slots for a respective key value matching the key.

26. The computer-readable medium of claim 25, wherein the step of searching the hash table further includes the step of searching for the key in a linked list of slots stored in an expansion region of the hash table, if the key was not found in the one or more respective slots for the key.

27. The computer-readable medium of claim 23, wherein said instructions are further arranged to cause the one or more processors to perform the step of, if an entry for the string is not found at a first slot that corresponds to the hash value, but is found in a slot that belongs to a sequence of slots that correspond to keys that produce said hash value, then moving a relative position of the entry for the string within the sequence of slots toward the beginning of the sequence of slots.

28. The computer-readable medium of claim 23, wherein said instructions are further arranged to cause the one or more processors to perform the step of initializing a descriptor for the hash table, said descriptor storing a reference to the hash table and parameters for the hash table;
   wherein the step of identifying a hash table includes the step of identifying a descriptor indicating the hash table and a prime number.

29. The computer-readable medium of claim 28, wherein the step of initializing a descriptor for the hash table includes the step of initializing a prime number for use in computing a hash value.

30. The computer-readable medium of claim 28, wherein the step of initializing a descriptor for the hash table includes the step of initializing a maximum number of slots for the hash table.

31. The computer-readable medium of claim 28, wherein the step of initializing a descriptor for the hash table includes the step of initializing a maximum length of the sequences of slots for the hash table.

32. A computer-readable storage medium bearing instructions for searching for a string in a lexical cache, said instructions arranged, when executed by one or more processors, to cause the one or more processors to perform the steps of:
  compressing the string to generate a key;
  identifying a hash table from among a plurality of hash tables based on a length of the key, said hash table containing sequences of slots for holding respective key values, each of said sequences of slots corresponding to a respective hash value and a number of slots being based on a respective key length, wherein at least one of the hash tables is configured to hold a different number of slots than at least another one of the hash tables;
  computing a hash value based on the key;
  using said hash value to locate a beginning of the particular sequence of slots that correspond to said hash value;
  searching the particular sequence of slots for a slot holding a key value matching the key; and
  if a slot having a key value matching the key is found in the particular sequence of slots, but is not at the beginning of said particular sequence of slots, then moving a relative position of the key value within the particular sequence of slots toward the beginning of the particular sequence of slots.

33. A method of storing a string in a lexical cache, comprising the computer-implemented steps of:
  generating a key based on the string;
  selecting a lexical container from among a plurality of lexical containers based on a length of the key, said lexical containers are associated with respective key lengths and configured to hold respective maximum numbers of entries based on the respective key lengths; and
  storing the string in an entry in the selected lexical container based on the key,
  wherein at least one of the lexical containers is configured to hold a different maximum number of entries than at least another one of the lexical containers.

34. The method of claim 33, wherein:
  a first lexical container of the lexical containers is associated with a first key length;
  a second lexical container of the lexical containers is associated with a second key length;
  the first key length is less than the second key length; and
  the first lexical container is configured to hold more entries than the second lexical container.

35. A computer-readable storage medium bearing instructions for storing a string in a lexical cache, said instructions arranged, when executed by one or more processors, to cause the one or more processors to perform the steps of:
  generating a key based on the string;
  selecting a lexical container from among a plurality of lexical containers based on a length of the key, wherein the lexical containers are associated with respective key lengths and configured to hold respective maximum numbers of entries based on the respective key lengths; and
  storing the string in an entry in the selected lexical container based on the key, wherein at least one of the lexical containers is configured to hold a different maximum number of entries than at least another one of the lexical containers.

36. A method of providing a lexical cache, comprising the computer-implemented steps of:
  allocating a plurality of lexical containers each configured to contain a respective maximum number of entries based on a function that includes a term that is inversely proportional to a logarithm of a key length associated with the lexical containers; and
  searching for one of the entries associated with a string within one of the plurality of lexical containers corresponding to a key generated based on the string.

* * * * *